June 20, 1933.  C. R. ELBERT  1,914,413
TOOL DRIVING MACHINE
Filed Oct. 3, 1931  2 Sheets-Sheet 1
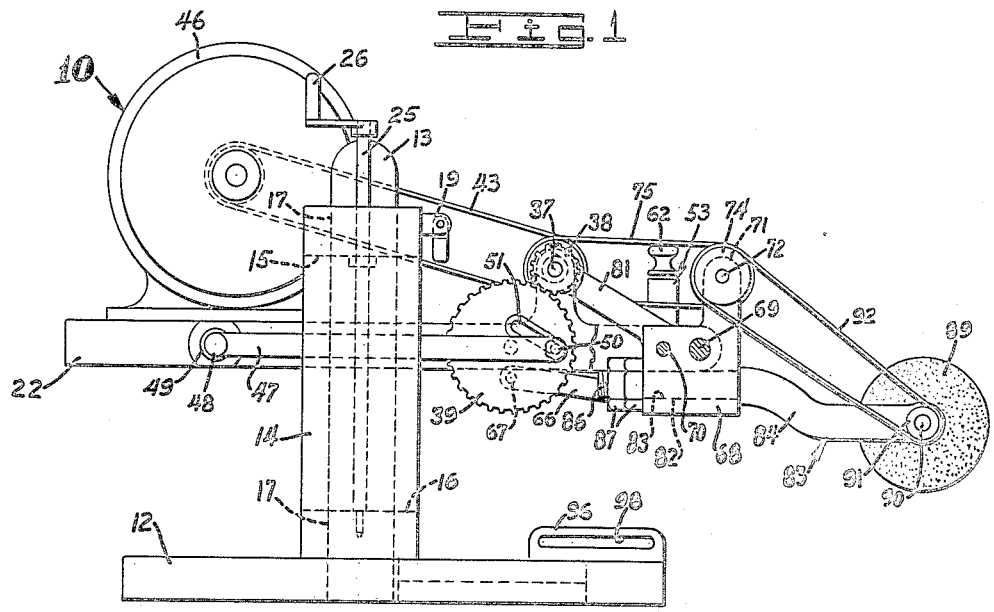
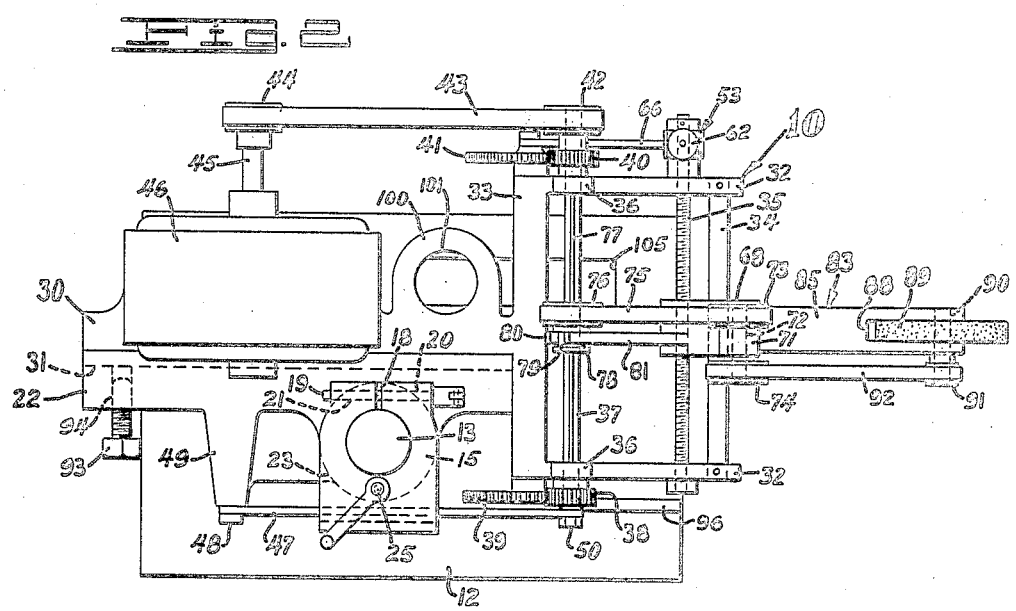
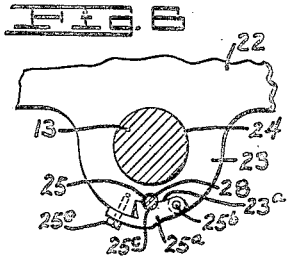
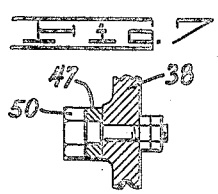
INVENTOR.
C. R. ELBERT
BY
ATTORNEY.

June 20, 1933.  C. R. ELBERT  1,914,413
TOOL DRIVING MACHINE
Filed Oct. 3, 1931  2 Sheets-Sheet 2
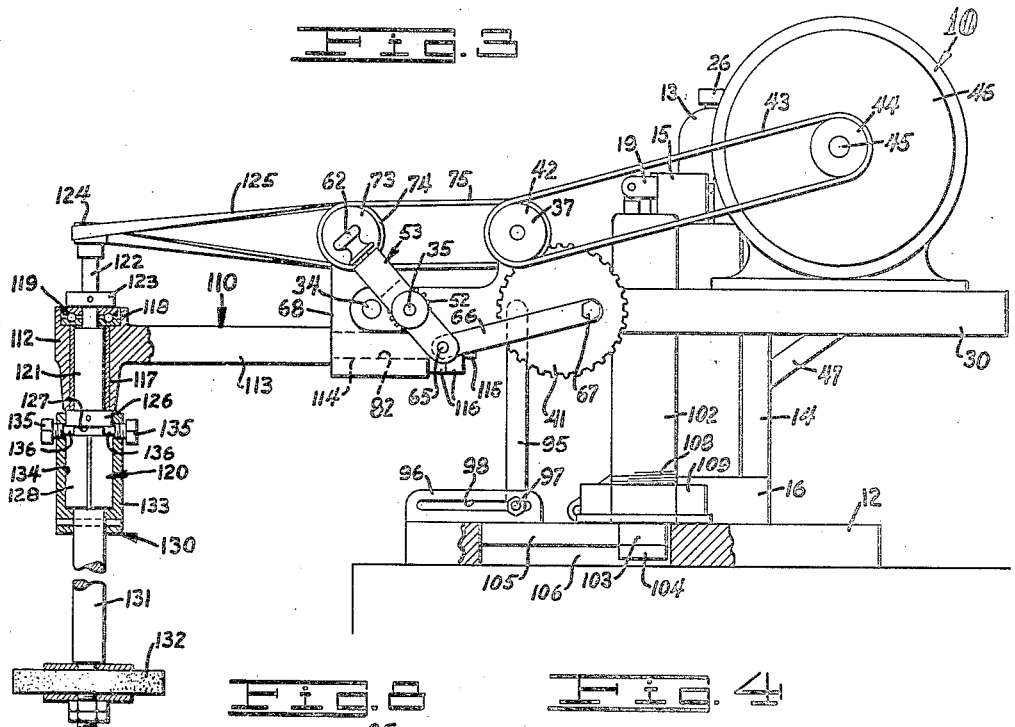
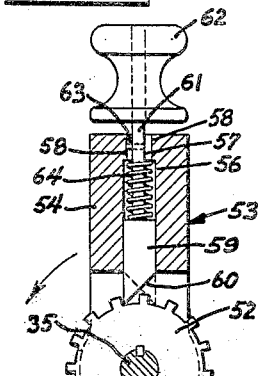
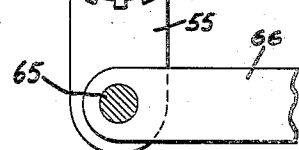
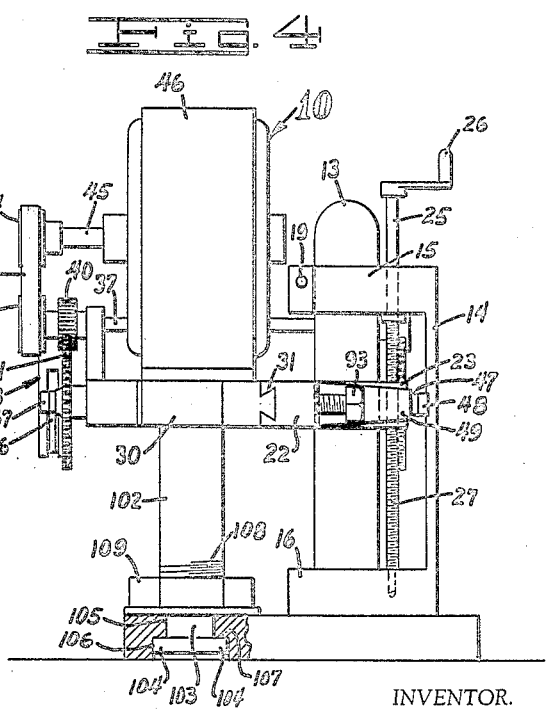
INVENTOR.
C. R. ELBERT
BY
ATTORNEY.

Patented June 20, 1933

1,914,413

UNITED STATES PATENT OFFICE

CLIFFORD E. ELBERT, OF LOS ANGELES, CALIFORNIA, ASSIGNOR OF ONE-HALF TO AXEL E. NYGREEN, OF LOS ANGELES, CALIFORNIA

TOOL DRIVING MACHINE

Application filed October 3, 1931. Serial No. 566,613.

This invention relates to improvements in tool driving machines.

The general object of my invention is to provide an improved tool driving machine wherein novel means is provided to cause the tool to travel in several directions.

Another object of the invention is to provide an improved tool driving machine which is portable.

A further object of the invention is to provide a tool driving machine of the class described including means for supporting and driving the tool in various positions.

Other objects and advantages of this invention will be apparent from the following description taken in connection with the accompanying drawings wherein:

Fig. 1 is a side elevation of my improved tool driving machine.

Fig. 2 is a top plan view of the device shown in Fig. 1.

Fig. 3 is a view similar to Fig. 1 showing the opposite side of the machine and showing a modified form of grinding wheel support and drive.

Fig. 4 is a rear end view of the device shown in Fig. 3.

Fig. 5 is an enlarged section through a portion of the lateral feed device.

Fig. 6 is an enlarged fragmentary plan view of the supporting plate showing the thread engaging member.

Fig. 7 is an enlarged fragmentary section of the connection between the horizontal reciprocating drive bar and its associated gear, and Fig. 8 is an enlarged fragmentary section showing the connection between the vertical reciprocating drive bar and the base.

Referring to the drawings by reference characters I have indicated my improved tool driving machine generally at 10. As shown the device 10 comprises a base 12 having a vertical annular post 13 rigidly mounted thereon. Mounted on the post 13 I provide a bracket 14 which includes an upper boss 15 and a lower boss 16, each of which are provided with an aperture 17 in which the post 13 is positioned. The bracket 14 is movable about the axis of the post 13 and for retaining it in an adjusted position I split the upper boss 15 as at 18 and provide a clamping bolt 19 which is positioned in an aperture 20 in one portion of the boss and a threaded aperture 21 in the other portion of the boss (see Fig. 2).

Mounted on the post 13 between the upper and lower bosses of the bracket 14 I provide a supporting plate 22 which includes a boss 23 having an aperture 24 therein in which the post 13 is positioned (see Fig. 6). The supporting plate 22 is movable about the axis of the post 13 and also movable vertically. For raising and lowering the supporting plate 22 I provide a rod 25 (see Fig. 4) which is rotatably positioned in suitable apertures in the upper and lower bosses of the bracket 14. The rod 25 includes an operating handle 26 for rotating it and a threaded portion 27 which is positioned in an unthreaded aperture 28 in the boss 23 of the supporting plate 22 (see Fig. 6).

For engaging the threaded portion 27 of the rod 25 to cause the supporting plate 22 to move up and down I provide a member $25^a$ which is positioned in a recess $23^a$ of the boss 23 and is pivotally connected to the boss as at $25^b$. The member $25^a$ is provided with a semi-cylindrical groove $25^c$ which is threaded to correspond to the threads 27 of the rod 25 which engage the threads of the groove $25^c$. The member $25^a$ is secured in an operative position by a bolt $25^e$. Thus it will be apparent that when the rod 25 is rotated the frame 22 will be either raised or lowered by the threaded portion 27 of the rod depending on which way the rod 25 is rotated.

Mounted on the supporting plate 22 I provide an operating frame 30 which is slidably connected to the supporting plate 22 by a dovetailed tongue and groove connection as indicated at 31 and clearly shown in Fig. 4. At one end of the operating frame 30 I provide a forked portion which includes spaced side members 32 connected by a back member 33. Adjacent the front of the forked portion I provide a rod 34 which extends from one side member 32 to the other and is rigidly secured thereto. Spaced in the rear of the rod 34 I provide a threaded rod 35 which is rotatably supported by the side members 32.

Adjacent the rear of the forked portion I provide on each of the side members 32 an upstanding bearing member 36 in which a drive shaft 37 is rotatably mounted. Secured to one end of the drive shaft 37 at the outside of the bearing 36 I provide a pinion gear 38 which meshes with a gear 39 rotatably mounted on the frame portion 33 and adjacent the opposite end of the drive shaft 37 I secure thereto a pinion gear 40 which meshes with a gear 41 rotatably mounted on the frame portion 33. Secured to the drive shaft 37 adjacent the pinion 40 I provide a pulley 42 which is adapted to be driven by a belt 43 from a pulley 44 secured to the armature shaft 45 of an electric motor 46 which is mounted on the operating frame 30. Thus it will be seen that when the motor 46 is operating the pulley 42 will be driven by the belt 43 from the pulley 44 thereby rotating the drive shaft 37 which will rotate the pinion gears 38 and 40, which in turn will rotate the gears 39 and 41.

For reciprocating the operating frame 30 I provide a bar 47 which is pivotally connected adjacent one end as at 48 to a boss 49 on the supporting plate 22. The opposite end of the bar 47 is connected to the gear 39 by a bolt and nut connection as indicated at 50 and clearly shown in Fig. 7. As shown the gear 39 is provided with an elongated aperture 51 in which the shank of the connecting bolt is positioned and by securing the bar 47 to the gear 39 at different points along the length of the aperture 51 various lengths of stroke may be had. From the foregoing it will be apparent that when the motor 46 is operating and the gear 39 is rotated as previously described the bar 47 being connected to the stationary supporting plate 22 will cause the operating frame 30 to be reciprocated in relation to the supporting plate.

For rotating the shaft 35 I secure thereto a toothed wheel 52 and loosely mounted on the shaft a frame 53 which includes a body portion 54 and side members 55 which straddle the toothed wheel 52 (see Figs. 3 and 5). The body portion 54 is provided with a recess 56 which communicates with a reduced aperture 57 opening through the top of the body and in the aperture 57 I provide opposed keyways or slots 58. Positioned in the recess 56 I provide a plunger 59 which includes a tapered portion 60 the end of which is adapted to engage the teeth of the wheel 52. The opposite end of the plunger 59 is provided with a reduced stem 61 which extends upwardly through the body aperture 57 where it is provided with an enlarged head 62. The stem 61 is provided with a pin 63 which extends from one side of the stem and is adapted to be positioned in either one or the other of the slots 58 to retain the plunger 59 in a correct position.

Positioned in the recess 56 and surrounding the stem 61 between the top of the plunger 59 and the bottom of the recess 56 I provide a coiled spring 64 which resiliently urges the plunger 59 into engagement with the toothed wheel 52.

Pivotally connected as at 65 adjacent the lower ends of the side members 55 I provide a bar 66 the opposite end of which is pivotally connected as at 67 to the gear 41 in the same manner as the bar 47 is to the gear 39 which is shown in detail in Fig. 7. Thus it will be apparent that when the gear 41 rotates the bar 66 will cause the frame 53 to rock about the axis of the rod 35. When the plunger 59 is set in the position shown in Fig. 5 and the frame 53 moves in the direction of the arrow the plunger 59 rotates the toothed wheel in the same direction which in turn rotates the rod 35.

When the frame 53 moves in the opposite direction the plunger 59 rides over the teeth of the toothed wheel 52 and does not rotate the wheel 52. When it is desired to rotate the rod 35 in the opposite direction to that indicated by the arrow an operator grasps the head 62 and moves the plunger upward against the action of the spring 64 until the pin 63 is clear of the aperture 57. The operator then gives the plunger a half turn and lowers it placing the pin 63 in the groove 58 opposite to the one it was removed from and thereby placing the pointed end 60 of the plunger on the opposite side as indicated by the dotted lines in Fig. 5. When the plunger 59 is in this position and the frame 53 is rocked the toothed wheel 52 and the rod 35 will be rotated in a direction opposite to that indicated by the arrow.

Slidably mounted on the rod 34 I provide a carrier member 68 which includes an aperture 69 in which the rod 34 is positioned and a threaded aperture 70 in which the threaded rod 35 is positioned. Mounted in a bearing 71 on the carrier 68 I provide a shaft 72 adjacent one end of which I secure a pulley 73 and adjacent the opposite end of the shaft I secure thereto a pulley 74. The pulley 73 is adapted to be driven by a belt 75 from a pulley 76 mounted on the drive shaft 37. The pulley 76 is slidable along the drive shaft 37 and is adapted to be rotated with the drive shaft by a spline 77 on the shaft 37.

The pulley 76 includes a hub 78 having an annular groove 79 therein in which the forked end 80 of an arm 81 is positioned. The arm 81 is integral with the carrier member 68 and retains the pulley 76 in a correct position relative to the pulley 73. From the foregoing it will be apparent that when the drive shaft 37 is rotating it will rotate the pulley 76 which will cause the belt 75 to rotate the pulley 73 which in turn will rotate the shaft 72 and the pulley 74. Furthermore, when the drive shaft 37 is rotating the gear 41 rocks the frame 53 through the medium of the bar 66 as previously described, thereby rotating the threaded rod 35 which as it rotates causes the carrier member 68 to move along the rod 34 from one side of the device toward the other depending on which way the rod 35 is rotating.

The carrier member 68 is provided with an aperture 82 which is arranged below the rods 34 and 35 and the axis of which is at right angles to the rods 34 and 35.

In Figs. 1 and 2 I have indicated at 83 one type of working head which is adapted to be mounted in the carrier member 68. As shown the working head 83 includes a body portion 84 having a reduced portion 85 which is positioned in the aperture 82 of the carrier member 68. The reduced portion 85 includes a threaded end portion 86 on which lock nuts 87 are positioned to secure the working head to the carrier. The end of the body 85 opposite the reduced portion is provided with a recess 88 in which a tool which is shown as an emery wheel 89 is positioned. The tool 89 is secured to a shaft 90 which is rotatably supported by the body 85 and has secured thereto adjacent one end a pulley 91 which is adapted to be driven by a belt 92 from the pulley 74. Thus it will be apparent that when the pulley 74 is rotating the belt 92 will rotate the pulley 91 which will rotate the shaft 90 which in turn will rotate the tool 89.

Although I have shown the tool 89 as being an emery wheel it will be understood that a disc saw, buffer, or other rotating tool may be used instead of the emery wheel with equal success.

In operation the operator turns the bracket 14 and the supporting plate 22 about the axis of the post 13 to the desired position and then clamps them in the adjusted position by the clamping bolt 19. The operator then raises or lowers the supporting frame 22 to the desired position by rotating the rod 25 in the correct direction.

The motor 46 is then started which will drive the shaft 37 which in turn will rotate the tool 89 as previously described. At the same time the operating frame 30 will be reciprocated as previously described and the carrier member 68 will travel from one side of the machine towards the opposite side as previously described. When the carrier member 68 reaches the limit of its travel towards one side the operator reverses the position of the plunger 59 as previously described thereby causing the carrier member 68 to travel in the opposite direction.

From the foregoing it will be apparent that when the motor 46 is operating the tool 89 is carried across the object upon which it is working in two directions, each at right angles to the other.

If it is desired to only have the operating frame 30 reciprocate and not have the carrier member 68 travel the operator moves the plunger 59 upward until the pin 63 clears the aperture 57 and then gives the plunger a quarter turn and lets the pin 63 rest on top of the body portion 54 of the frame 53 whereupon the pointed end 60 of the plunger will be retained out of engagement with the toothed wheel 52 and will not rotate the toothed wheel when the frame 53 is rocked.

If it is desired to have only the carrier member 68 move and not have the operating frame 30 reciprocate the bar 47 is disconnected from the gear 39 and the operating frame 30 secured in a stationary position by a set screw 93 (Fig. 2) positioned in a threaded aperture 94 provided in the supporting plate 22.

At other times it may be desired to have the tool 89 travel across the work from side to side and also in a vertical direction. To do this the operator disconnects the bar 47 from the gear 39 and secures one end of a bar 95 to the gear 39 in the same manner as the bar 47 and the opposite end of the bar 95 is connected to a boss 96 on the base 12 by a bolt and nut connection as indicated at 97 and clearly shown in Figs. 3 and 8. The boss 96 is provided with an elongated aperture 98 in which the shank of the securing bolt is positioned to allow for adjusting the tool various distances from the post 13.

The operator then releases the bolt $25^e$ from the boss 23 and swings the member $25^a$ out of engagement with the threads 27 of the rod 25 whereupon the supporting plate is freely movable along the axis of the rod 25.

Thus it will be apparent that when the gear 39 is rotated the bar 95 being secured to the base 12 will cause the operating frame 30 and the supporting plate 22 to be reciprocated vertically.

To steady the operating frame 30 when it is reciprocated vertically I provide thereon a boss 100 having an aperture 101 therein in which a post 102 is adapted to be positioned. (See Figs. 2 and 3.) The lower end of the post 102 is provided with a reduced portion 103 having oppositely extending ears 104 thereon. The reduced portion 103 of the post 102 is positioned in an elongated aperture 105 provided in the base 12 and the ears 104 are adapted to be positioned in an enlarged recess 106 provided in the base 12. After the ears 104 are positioned in the recess 106 the post is turned a quarter turn so that the ears 104 underlay the shoulder 107 formed at the juncture of the aperture 105 and the recess 106. Adjacent the reduced end of the post I provide thereon screw threads as indicated at 108 on which a lock nut 109 is positioned which when tightened against the base 12 draws the ears 104 up against the shoulders 107 thereby clamping the post 102 rigid to the base 12.

In Fig. 3 I have indicated generally at 110 a modified form of working head. As shown the working head 110 includes a body portion 112 and an arm 113 having a reduced stem portion 114 adjacent the end. The stem 114 is positioned in the aperture 82 of the carrier 68 and includes a threaded portion 115 on which lock nuts 116 are positioned to secure the working head to the carrier 68.

The body 112 includes a bushed aperture 117 which communicates with an enlarged recess 118 having an anti-friction bearing 119 positioned therein.

Supported by the working head 110 I provide a tool head 120 which includes a shaft portion 121 positioned in the aperture 117. The shaft 121 includes an upwardly extending reduced portion 122 which extends through the anti-friction bearing 119 and has a collar 123 secured thereto. This collar engages the anti-friction bearing and supports the tool head 120. Secured to the reduced portion 122 above the collar 123 I provide a pulley 124 which is driven from the pulley 74 by a belt 125. Secured to the shaft 122 adjacent the lower end of the body 112 I provide a collar 126 and spaced from the collar 126 to provide a groove 127, I provide an enlarged portion 128 on the shaft which is preferably square in cross section.

Removably secured to the tool head 120 I provide a tool holder 130. As shown the tool holder 130 includes a stem 131 to which a tool 132, which is shown as an emery wheel, is secured. The end of the stem opposite the tool 132 is secured to a socket portion 133 which includes a squared recess 134 in which the enlarged squared portion 128 of the tool head 120 is positioned. For supporting the tool holder 130 I provide a plurality of set screws 135 on the socket 133 which include reduced end portions 136 which are positioned in the groove 127 of the tool head 120.

From the description it will be apparent that when the pulley 74 on the carrier 68 is rotated as previously described the belt 125 will rotate the pulley 124 which will rotate the tool head 120 which in turn will rotate the tool holder 130 and thereby rotate the tool 132.

From the foregoing description it will be apparent that I have provided a novel tool driving machine which is simple in construction and highly efficient in use.

Having thus described my invention, I claim:

1. In a tool driving machine, a base, a supporting plate, an operating frame supported by said supporting plate and movable relative thereto, a drive shaft supported by said operating frame, a gear rotatably mounted on said operating frame, means to drive said gear from said drive shaft, a bar pivotally connected adjacent one end to said supporting plate and pivotally connected adjacent the opposite end to said gear whereby when said gear rotates said operating frame will be reciprocated, a second gear pivotally mounted on said operating frame opposite said first gear, means to drive said second gear from said drive shaft, a threaded rod supported by said operating frame, an operating member pivotally mounted on said threaded shaft, a bar pivotally connected adjacent one end to said second gear and pivotally connected adjacent the opposite end to said operating member whereby upon rotation of said second gear said operating member will be rocked, said operating member including means to rotate said threaded shaft, a rod supported by said side members, a carrier member movably supported on said last mentioned rod and including means engaging said threaded shaft whereby upon rotation of said threaded shaft said carrier will be moved and a working head secured to said carrier.

2. In a tool driving machine, a base, a post on said base, a supporting plate on said post, said plate being movable about the axis of said post and being movable axially on said post, threaded means to move said supporting plate axially, an operating frame supported by said supporting plate and movable relative thereto at right angles to the axis of said post, a drive shaft supported by said operating frame, means to drive said drive shaft, a gear rotatably mounted on said operating frame, means to drive said gear from said drive shaft, a bar pivotally connected adjacent one end to said supporting plate and pivotally connected adjacent the opposite end to said gear whereby when said gear rotates said operating frame will be reciprocated, a second gear pivotally mounted on said operating frame opposite said first gear, means to drive said second gear from said drive shaft, a threaded rod supported by said operating frame, an operating member pivotally mounted on said threaded shaft, a bar pivotally connected adjacent one end to said second gear and pivotally connected adjacent the opposite end to said operating member whereby upon rotation of said second gear said operating member will be rocked, said operating member including means to rotate said threaded shaft, a rod supported by said side members, a carrier member engaging said threaded shaft whereby upon rotation of said threaded shaft said carrier will be moved, a working head secured to said carrier and a tool on said working head.

3. In a tool driving machine, a base, a post on said base, a supporting plate on said post, said plate being movable about the axis of said post and being movable axially on said post, a threaded means to move said supporting plate axially, an operating frame supported by said supporting plate and movable relative thereto at right angles to the axis of said post, a drive shaft supported by said operating frame, means to drive said drive shaft, a gear rotatably mounted on said operating frame, means to drive said gear from said drive shaft, a bar pivotally connected adjacent one end to said supporting plate and pivotally connected adjacent the opposite end to said gear whereby when said gear rotates said operating frame will be reciprocated, a second gear pivotally mounted on said operating frame opposite said first gear, means to drive said second gear from said drive shaft, a threaded rod supported by said operating frame, an operating member pivotally mounted on said threaded shaft, a bar pivotally connected adjacent one end to said second gear and pivotally connected adjacent the opposite end to said operating member whereby upon rotation of said second gear said operating member will be rocked, said operating member including means to intermittently rotate said threaded shaft, said means being selective to rotate said threaded shaft in either direction, a rod supported by said side members, a carrier member movably supported on said last mentioned rod and including means engaging said threaded shaft whereby upon rotation of said threaded shaft said carrier will be moved, a working head secured to said carrier, a tool on said working head, a shaft supported by said carrier, means to drive said carrier shaft from said drive shaft and means to drive said tool from said carrier shaft.

4. In a tool driving machine, a base, a post on said base, a supporting plate on said post, said plate being movable about the axis of said post and being movable axially on said post, threaded means to move said supporting plate axially, an operating frame supported by said supporting plate and movable relative thereto at right angles to the axis of said post, a fork-like portion adjacent one end of said frame including side members, a drive shaft supported by said operating frame and extending transversely of said forked portions, means to drive said drive shaft, a gear rotatably mounted on said operating frame adjacent one of said fork side members, means to drive said gear from said drive shaft, a bar pivotally connected adjacent one end to said supporting plate and pivotally connected adjacent the opposite end to said gear whereby when said gear rotates said operating frame will be reciprocated, a second gear pivotally mounted on said operating frame opposite said first gear, means to drive said second gear from said drive shaft, a threaded rod supported by said operating frame, an operating member pivotally mounted on said threaded shaft, a bar pivotally connected adjacent one end to said second gear and pivotally connected adjacent the opposite end to said operating member whereby upon rotation of said second gear said operating member will be rocked, said operating member including means to intermittently rotate said threaded shaft, said means being selective to rotate said threaded shaft in either direction, a rod support by said side members, a carrier member movably supported on said last mentioned rod and including means engaging said threaded shaft whereby upon rotation of said threaded shaft said carrier will be moved, a working head secured to said carrier, a tool on said working head, a shaft supported by said carrier, means to drive said carrier shaft from said drive shaft and means to drive said tool from said carrier shaft.

5. In a tool driving machine, a supporting member, an operating frame, means to support said frame on said member for linear movement, a motor on said frame, a drive shaft operated by said motor, means for reciprocating said frame, a cross rod mounted on said frame, a tool carrier mounted on said cross rod, a tool mounted on said carrier, a rotatable threaded rod on said frame, said carrier having means thereon engaging said threaded rod, means driven by said motor to rotate said threaded rod whereby said carrier is moved along the rod, a driving member connected to said carrier and splined to said drive shaft to move therealong as the carrier moves along the threaded member and means to drive said tool from said driving member.

6. In a tool driving machine, a supporting member, an operating frame, means to support said frame on said member for linear movement, a motor on said frame, link means operated by said motor for reciprocating said frame, a cross rod mounted on said frame, a tool carrier mounted on said cross rod, a tool mounted on said carrier, a threaded rod rotatable on said frame, said carrier having means thereon engaging said threaded rod, link means driven by said motor to rotate said threaded rod whereby said carrier is moved along the rod, means to reverse the direction of movement of said threaded member, and means to drive a tool on said carrier.

7. In a tool driving machine, a supporting member, an operating frame, means to support said frame on said member for linear movement, a motor on said frame, a drive shaft operated by said motor, means operated by said motor for reciprocating said frame, a tool carrier mounted on said frame for transverse movement, a tool mounted on said carrier, a rod on said frame, said carrier having means thereon engaging said rod to move along the latter, means driven by said motor to move the carrier along the rod, means to drive a tool on said carrier, said means including a drive shaft, means whereby said motor actuates said drive shaft, a driving member connected to said carrier and splined to said drive shaft to move therealong as the carrier moves transversely and means to drive said tool from said driving member.

8. In a tool driving machine, a supporting member, an operating frame, means to support said frame on said member for linear movement, a motor on said frame, a drive shaft operated by said motor, link means operated by said motor for reciprocating said frame, a cross rod mounted on said frame, a tool carrier mounted on said cross rod, a tool mounted on said carrier, a rotatable threaded rod on said frame, said carrier having means thereon engaging said threaded rod, link means driven by said motor to rotate said threaded rod whereby said carrier is moved along the rod, means to reverse the direction of movement of said threaded member, a driving member connected to said carrier and splined to said drive shaft to move therealong as the carrier moves along the threaded member and means to drive said tool from said driving member.

9. In a tool driving machine, a base, an operating frame linearly movable on said base, a motor, link means operated by said motor to reciprocate said frame, a crank, means whereby said motor drives said crank, a threaded rod rotatably supported by said operated frame, an operating member mounted on said threaded rod, means whereby said crank actuates said operating member in step by step motion to rotate said threaded shaft, a cross rod supported by said operating frame, a carrier member supported on said last mentioned rod for linear movement and including means engaging said threaded shaft whereby upon rotation of said threaded shaft said carrier will be moved, a working head secured on said carrier, and a tool mounted on said working head.

10. In a tool driving machine, a base, a supporting plate, an operating frame supported by said supporting plate and movable relative thereto, a motor, a shaft, means whereby said motor drives said shaft, means connecting said shaft and said operating frame whereby movement of said shaft reciprocates said frame, a crank, means whereby said motor drives said crank, a threaded rod rotatably supported, an operating member mounted on said threaded rod, means whereby said crank, actuates said operating member in step by step motion to rotate said threaded shaft, a cross rod supported by said operating frame, a carrier member supported on said last mentioned rod for linear movement and including means engaging said threaded shaft whereby upon rotation of threaded shaft said carrier will be moved, a working head on said carrier, and a tool on said working head.

11. In a tool driving machine, a base, a supporting plate, an operating frame supported by said supporting plate and linearly movable relative thereto, means to support said operating frame in adjusted vertical positions relative to said base, a motor, a shaft, means whereby said motor drives said shaft, a crank pin driven by said shaft, link means connecting said crank pin and said operating frame whereby movement of said shaft reciprocates said frame, a crank means whereby said motor drives said crank, a threaded rod rotatably supported by said operated frame, an operating member including a part mounted on said threaded rod, means whereby said crank actuates said operating member in step by step motion to rotate said threaded shaft, a cross rod supported by said operating frame, a carrier member supported on said last mentioned rod for linear movement and including means engaging said threaded shaft whereby upon rotation of threaded shaft said carrier will be moved, a working head on said carrier, a tool on said working head and means whereby said motor drives said tool.

In testimony whereof, I hereunto affix my signature.

CLIFFORD R. ELBERT.